A. A. WOOD.
GIN SAW GUMMER.
APPLICATION FILED MAY 20, 1915. RENEWED SEPT. 18, 1916.

1,203,443.

Patented Oct. 31, 1916.
6 SHEETS—SHEET 1.

A. A. WOOD.
GIN SAW GUMMER.
APPLICATION FILED MAY 20, 1915. RENEWED SEPT. 18, 1916.

1,203,443.

Patented Oct. 31, 1916.
6 SHEETS—SHEET 5.

UNITED STATES PATENT OFFICE.

ALBERT A. WOOD, OF ATLANTA, GEORGIA, ASSIGNOR OF ONE-THIRD TO ALBERT P. WOOD AND ONE-THIRD TO EDWARD P. WOOD, BOTH OF ATLANTA, GEORGIA.

GIN-SAW GUMMER.

1,203,443.   Specification of Letters Patent.   Patented Oct. 31, 1916.

Application filed May 20, 1915, Serial No. 29,383.   Renewed September 18, 1916.   Serial No. 120,884.

*To all whom it may concern:*

Be it known that I, ALBERT A. WOOD, a citizen of the United States, residing at Atlanta, in the county of Fulton and State of Georgia, have invented certain new and useful Improvements in Gin-Saw Gummers; and I do hereby declare the following to be a full, clear, and exact description of the invention, such as will enable others skilled in the art to which it appertains to make and use the same.

This invention relates to gin saw gummers, and has for an object to provide a machine placed in operative relation with a gin saw, and embodying new and improved means for feeding the saw with a step-by-step movement, and simultaneously raising and lowering a rotating file to even up and increase the depth of the interdental space.

A further object of the invention is to provide a machine of the type embodying many new and improved features of adjustment whereby the step-by-step movement of the saw is properly accomplished as well as the angle of the several surfaces of the tooth itself.

A further object of the invention is to provide new and improved means for clamping the mechanism as an organized structure upon space blocks between the gin saws.

With these and other objects in view the invention consists in certain novel features of construction, combination and arrangement of parts as will be hereinafter more fully described and claimed.

In the drawings.

Like characters of reference designate corresponding parts throughout the several views.

The gin saw gummer which forms the subject-matter of this application is adapted to be used in conjunction with a gin saw of substantially the usual and ordinary form as shown conventionally at 20, mounted upon an arbor 21 with the usual space blocks 22 interposed between the saws, the drawings showing only a single saw and a single space block, it being understood of course that the saws are arranged upon the arbor in the usual spaced relation and spaced by the space blocks, the number of saws depending upon the length of the arbor in the usual and well-known manner.

The rigid frame 23 of the gummer has a section 24 secured thereon as by the screws 25. The part 24 is spaced away from the part 23 producing a fork to receive the saw 20 and similar arch portions 26 to engage against and bear upon the space blocks upon opposite sides of the saw. To the fork thus composed a jaw is pivoted composed of the members 27 and 28, secured together in spaced relation by the screws 29 to also straddle the saw, such jaw members having ears 30 and 31 straddling the frame composed of the members 23 and 24 pivotally connected therewith by the pivot pin 32. Fulcrumed also to the frame 23 is a lever 33 connected with the fork jaw by means of a link 34, to which said lever a strut 35 is connected, bearing upon the floor and tending to clamp the fork jaw upon the space blocks, the jaw having an inner arcuate face complementary to the curve 26 of the frame.

Figure 1:
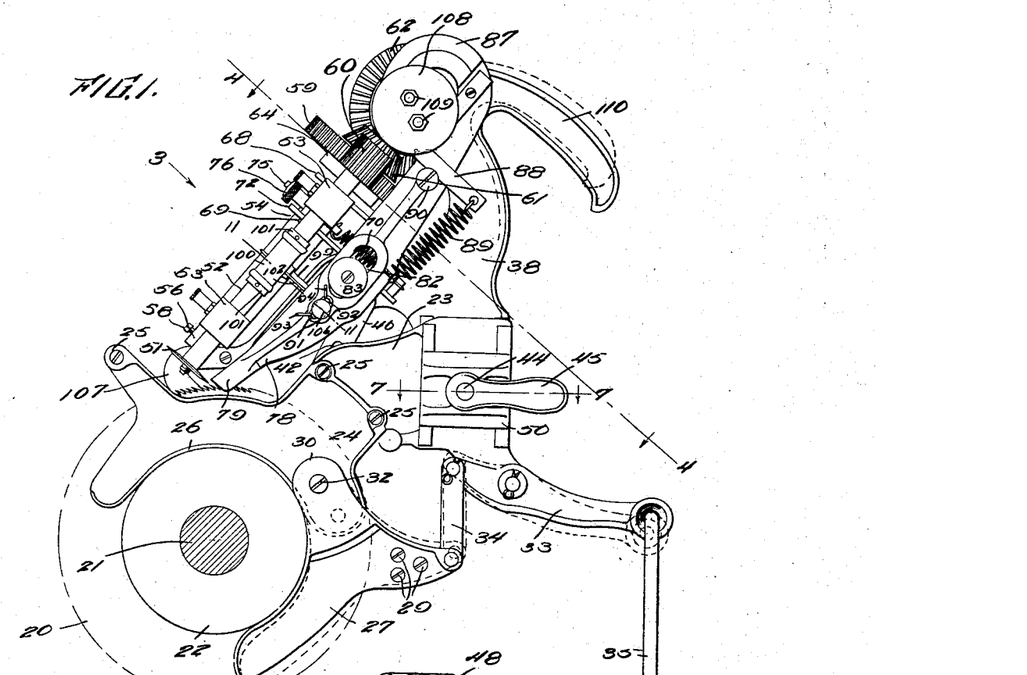
—Figure 1 is a view of the improved machine in side elevation clamped upon a spacer block and embracing a saw.
Figures 2, 6:
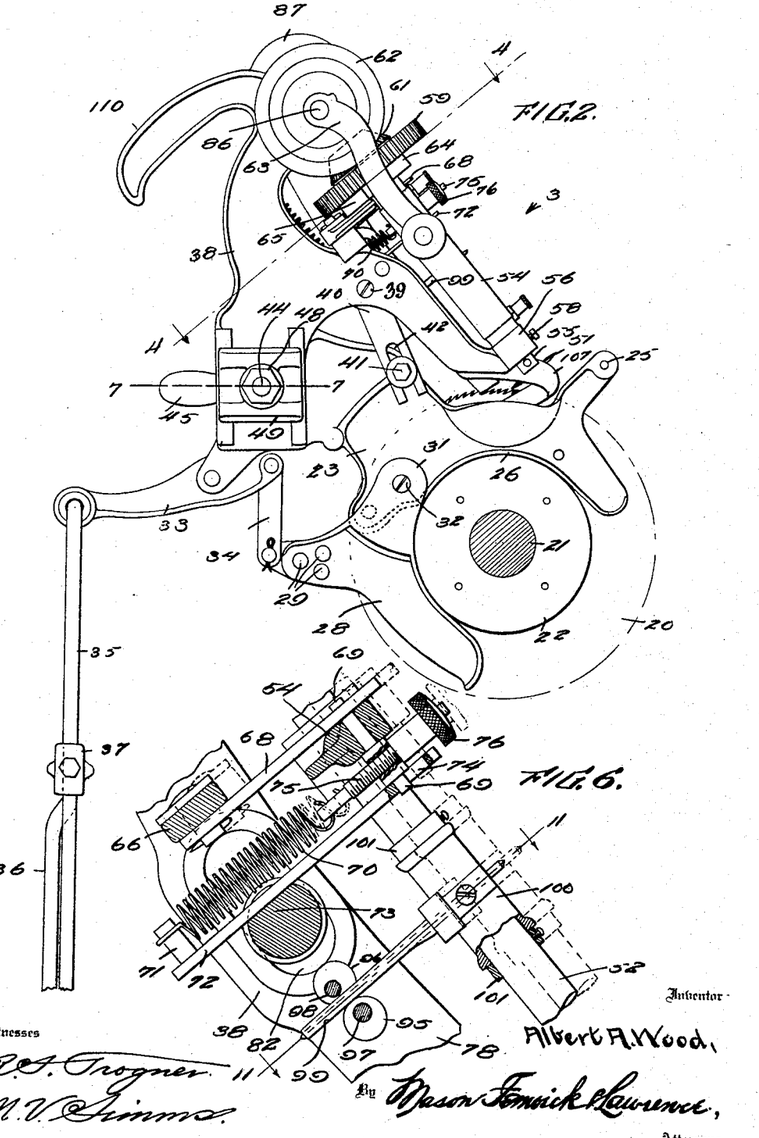
Fig. 2 is a view of the machine in side elevation seen from the side opposite the view of Fig. 1.
Fig. 6 is a fragmentary sectional view taken on line 6—6 of Fig. 3.

The strut is preferably composed of telescoping or adjustable sections 35 and 36 held in adjusted relation by a clip or clamp 37 whereby the combined or working length of the strut may be varied according to the height from the floor of the saw arbor. In adjusting this device upon the arbor, it is desirable that the length of the strut shall be such as to maintain the major axis of the frame 23 at a considerable inclination as shown more particularly at Figs. 1, 2 and 5.

Figures 5, 8, 9, 10:
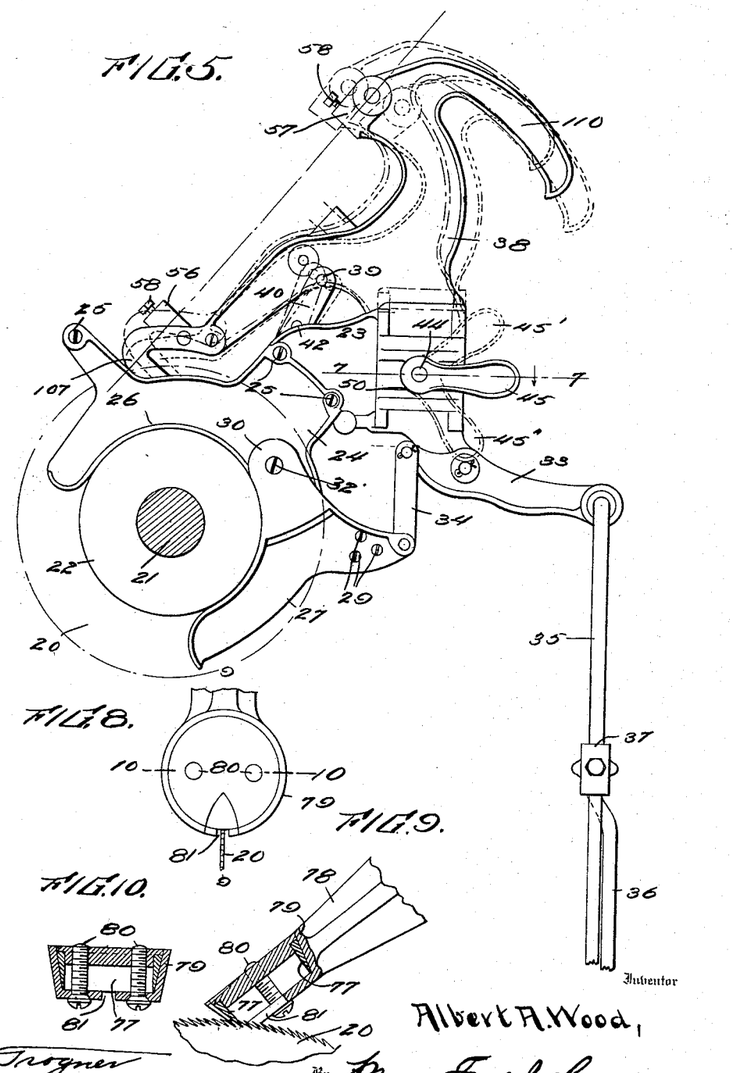
Fig. 5 is a view of the frame of the machine in side elevation showing some of the adjustments within the frame itself.
Fig. 8 is a top plan view of the feed showing a section of the saw.
Fig. 9 is a diametrical sectional view of the feed taken on line 9—9 of Fig. 8.
Fig. 10 is a diametrical sectional view of the feed taken on line 10—10 of Fig. 8.
Figures 7, 12:
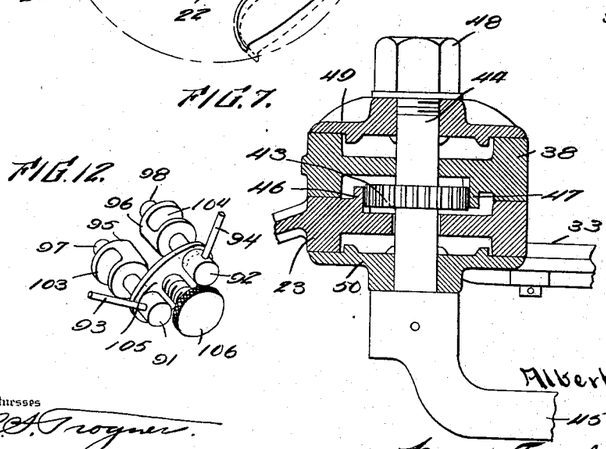
Fig. 7 is a detail fragmentary view taken on line 7—7 of Figs. 1, 2 and 5.
Fig. 12 is a detail perspective view of the eccentrics.

Upon the main frame 23 an auxiliary frame 38 is mounted by means of being pivotally connected at 39 to a link 40, which said link is again pivoted to the frame 23 by the pivot 41, the link being adjustable relative to the pivot 41 by means of the slot 42 formed therein. The inclination of the auxiliary frame 38 relative to the frame 23 can also be adjusted by means of a pinion 43 shown more particularly at Fig. 7, such pinion being mounted upon a shaft 44 controlled by the crank-arm 45. The pinion 43 engages a rack 46 on the frame 23, and a rack 47 on the auxiliary frame 38 so that as the crank-arm 45 is rotated the auxiliary frame 38 is moved through the several stages to the dotted line position 45′ upon one side and the broken line position 45″ upon the other side as shown at Fig. 5. To maintain the adjustment of the frame 38 to the frame 23, a nut 48 is provided upon the shaft 44 bearing against a washer 49 bearing upon and slidable relative to the auxiliary plate 38, a similar washer 50 being provided upon the other side bearing against and slidable upon the frame 23.

The auxiliary frame carries the several working parts of the gumming apparatus, and it is obvious that by adjusting the auxiliary frame relative to the main frame 23, as just above disclosed, the relation of the gumming mechanism to the forks engaging the saw and the spacer blocks may be changed and varied at will.

Figures 3, 4, 11:
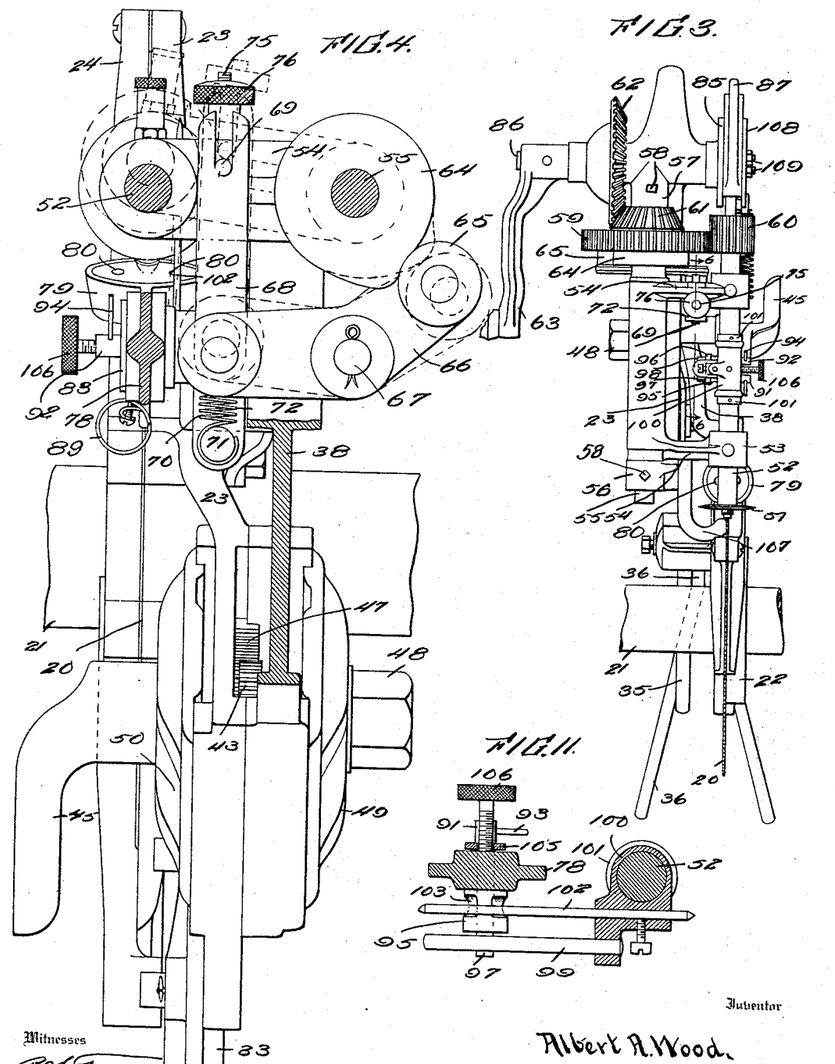
Fig. 3 is a view of the machine seen from the top on the plane indicated by the arrow 3 at Figs. 1 and 2.
Fig. 4 is an enlarged sectional view taken on line 4—4 of Figs. 1 and 2.
Fig. 11 is a detail sectional view of the eccentrics as indicated by line 11—11 of Figs. 1, 3 and 6.

The gumming mechanism comprises a circular file 51 carried at the extremity of the file shaft 52 mounted in bearings 53 for both rotative and longitudinal movement. The bearings 53 are not carried directly and rigidly upon the auxiliary frame 38, but upon a yoke 54 mounted to swing upon a shaft 55 as indicated more particularly at Fig. 4. The shaft 55 is mounted rigid relative to the auxiliary frame 38 by engagement in sleeves 56 and 57 secured by set screws 58. Journaled also upon the shaft 55 is the gear 59 intergeared with the pinion 60 upon the file shaft 52 and by which the file shaft is rotated. It will be noted that the pinion 60 has a wider face than the gear 59 which permits the longitudinal movement of the file shaft 52 as above mentioned. Integral or rigidly connected with the gear 59 is a beveled gear 61 intergeared with a beveled gear 62 through which is connected the power in any approved manner here shown as the crank 63. It is obvious therefore that as the crank 63 is rotated the circular file 51 will also be rotated to act upon the face of the saw 20. In addition to the rotating and longitudinal movement of the file shaft 52, a lateral movement is also provided by means of a cam 64 rigidly mounted relative to the gear 59 and rotating therewith and bearing against a roller 65 carried upon a lever 66 which is fulcrumed at 67 to the auxiliary frame 38. At its end opposite the roller 65 the lever 66 is pivotally connected with a link 68 which is bifurcated at its upper end and embraces a pin 69 carried by the yoke 54, so that a motion is provided as indicated at Fig. 4 in dotted lines to move the file shaft 52 laterally, being substantially a vertical movement, and moving thereby the file 51 out of the interdental spaces of the saw 20. A spring 70 is employed to exert tension upon the yoke 54 attached to a pin 71 which is carried by a bar 72 rigidly connected with the auxiliary frame 38 in any approved manner as by the screw 73 shown more particularly at Fig. 6, and providing a slot 74 to limit the movement of the pin 69 and therewith the yoke 54. To vary the tension on the spring 70 a screw 75 is provided controlled by a knurled nut 76. It will therefore be obvious that when the yoke 54 and the file shaft 52 are raised to the dotted position shown at Fig. 4 by the action of the cam, it is against the tension of the spring 70 and that the spring 70 tends to return the parts to normal position as soon as the rotation of the cam permits the return of the parts. The bifurcation in the end of the link 68 permits the lever 66 to return to normal position while the yoke 54 and file shaft may be held above normal position by the engagement of the file with the bottom of the interdental spaces, and to be worked down by the tension of the spring 70 as the material of the saw is gummed out by the rotation of the file.

It is obvious that to properly act upon the saw with a continuous action means must be provided to advance the saw relative to the gumming mechanism with a step-by-step movement. Such a step-by-step actuation is provided in the feed mechanism of the machine which comprises a ring 77 properly proportioned to engage within the interdental spaces of the saw as indicated more particularly at Fig. 9. The ring 77 is carried at the end of the feed arm 78 by means of being clamped within a ring 79 by means of screws 80, a slot 81 being cut out of the ring 79 to accommodate the saw and expose a small section of the feed ring 77. It is obvious that by loosening the screws 80 the feed ring 77 may be rotated in the ring 79 to expose a fresh or unworn portion of such feed ring to the slot 81 and to act upon the saw 20.

The feed arm 78 is mounted to move relative to the auxiliary frame 38 by means of a slot 82 and maintained in position by means of a washer 83. Motion of the feed arm is provided by means of cam rollers 84 carried upon a disk 85 which is in turn carried upon the shaft 86 and is therefore rotative with the crank. The feed arm 78 is provided with a hooked extremity 87. The hooked end 87 of the feed arm is made considerably heavier than the opposite end which tends at all times to lift the feed ring 77 out of engagement with the teeth of the saw 20. The rotation of the cam rollers 84 with the disk 85 tends therefore to lift against the top of the hook 87, the action being shown particularly at Figs. 13 to 16. At Fig. 13 the hook 87 is shown downwardly and the feed ring 77 therefore disengaged from the teeth of the saw. As the cam rollers 84 rotate to the position shown at Fig. 14 they naturally lift the hook 87, thereby depressing the feed ring 77 which, by means of its engagement with the saw and the rotary movement of the saw, tends to not only force the feed ring downwardly but to move it toward the fulcrum pin at 83. The continued movement of the cam rollers 84 engages one of said rollers against the L-shaped lever 88 which is held yieldingly above the surface of the arm 78 by means of the spring 89 tending thereby to add yielding pressure to the weight of the hooked end 87 to lift it from engagement with the teeth of the saw. A stop 90 is provided to limit the movement of the L-shaped lever 88.

It is desirable that the file remain in engagement with the material of the saw throughout as great a portion of the operation as possible, so that no waste time will result from the inaction. To accomplish this it is desirable to have the file move longitudinally with the feed when the feed advances the saw with the step-by-step movement. To accomplish this movement of the file, the feed arm carries a pair of eccentrics comprising pins 91 and 92 having respectively levers 93 and 94 carried thereby, the pins extending through the arm 78 and provided respectively with heads 95 and 96 as shown more particularly at Figs. 3 and 12. Studs 97 and 98 are carried by the heads 95 and 96 respectively between which are engaged a rod 99 carried rigidly by a sleeve 100 so that as the feed arm reciprocates the file shaft is also reciprocated therewith, the sleeve 100 bearing against collars 101 against which the sleeve 100 abuts. The bar 99 and the eccentric pins 97 and 98 are intended rather as emergency devices to prevent abnormal deflection of the spring 102 which is provided to engage between the depressions 103 and 104 in the heads 95 and 96 respectively, such spring being also rigidly connected with the sleeve 100 and under ordinary conditions moving the file shaft therewith. Through the spring 102 and the eccentrics 95 and 96 the correlative movements of the file and feed lever are gaged in extent so that varying circular pitches of the saw-teeth are accommodated and a movement forward of the file with the feed lever located by its engagement in an interdental space is only permitted to the extent desired, which is just sufficient to cause its central plane to coincide with the bi-secting angle between the front and back of the contiguous teeth, and allow it to fall into said space without filing the back or front of the contiguous teeth.

To properly clamp the eccentric mechanism in the position arrived at by operating the levers 93 and 94 a plate 105 carries a screw 106 which bears against the feed arm 78 and the plate bearing against the heads of the pins 91 and 92 clamps them in adjusted position.

The auxiliary frame 38 also carries a finger 107 which engages against the side of the saw toward which the file is moving in its operative rotation, such finger being intended to prevent the saw from "chattering" when it is being operated upon.

To cover the cam rollers 84 a disk 108 is employed secured in spaced relation with the disk 85 by means of nuts 109 upon the studs carrying the rollers 84. The disks 85 and 108 serve to properly position the hook 87 between them and prevent lateral movement thereof. The machine is also provided with a handle 110 which, while preferably formed as an integral part of the auxiliary frame 38, obviously forms means for handling the entire mechanism when the auxiliary frame is rigidly connected with the main frame 23 by tightening the nut 48 as hereinbefore described.

With the relation shown between the pinion 61 and gear 62 it is obvious that a complete cycle of operation will be accomplished at each half revolution of the crank 63. It is also obvious that the relation of the parts may be so changed as to perform a cycle of operation in any predetermined relation to the revolution of the crank.

Figures 13, 14:
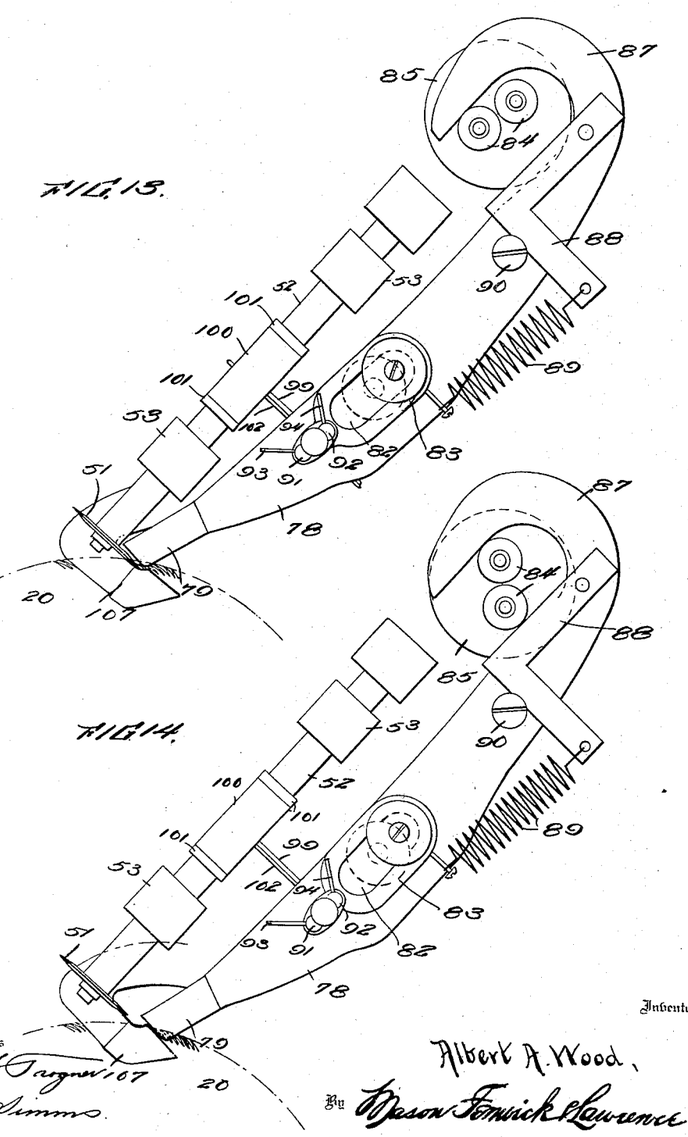
Fig. 13 is a diagrammatic view showing the beginning of the stroke of the file and feed.
Fig. 14 is a diagrammatic view showing the second step of movement of the file and feed.
Figures 15, 16:
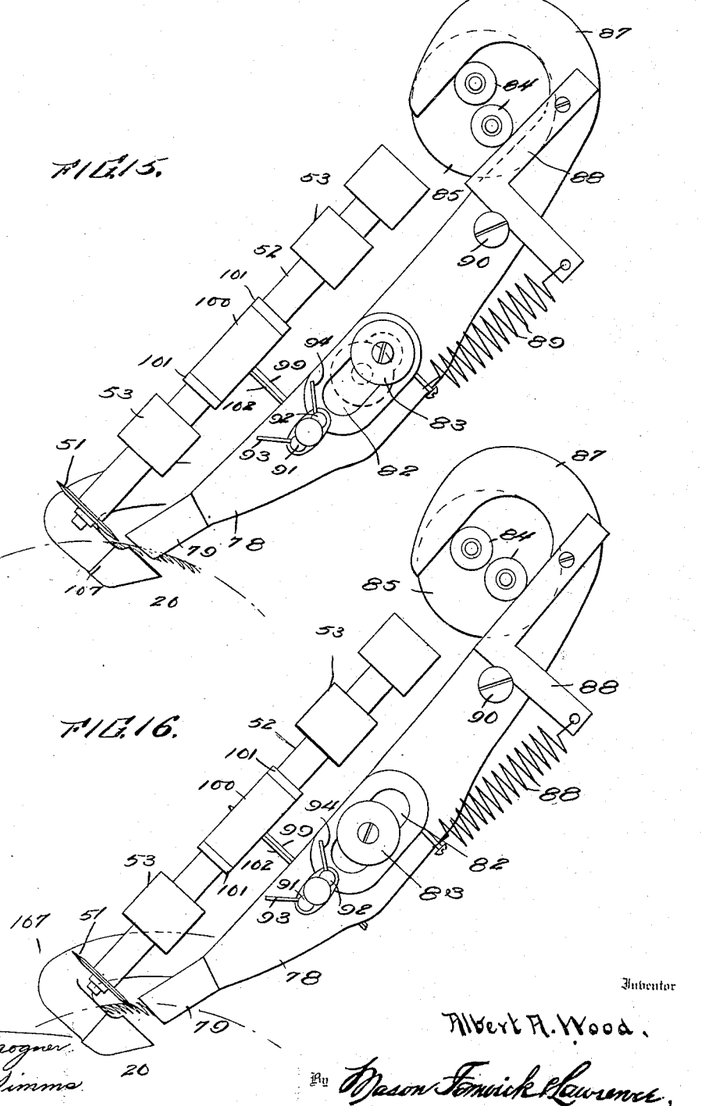
Fig. 15 is a diagrammatic view showing the third step of the movement of file and feed.
Fig. 16 is a diagrammatic view showing the fourth and last step of the movement of the file and feed from which step the file and feed returns to the position shown at Fig. 13.

A complete cycle of operation would be as follows: Referring to Figs. 13 to 16 inclusive, the finger 107 represents the normally stationary part of the mechanism, and the operation of the feed and file relative thereto will be described. With the parts located as shown at Fig. 13, the file is at its lowest point just completing the gumming of an interdental space with the feed raised and the file about to rise. It is to be understood that the file is continually rotating irrespective of the movement of the other parts so that as the parts are moved they assume the first position shown at Fig. 14 wherein the file is raised out of engagement with the saw to clear the extremities of the teeth, while simultaneously the feed is forced downwardly and of course must travel along the line of the periphery of the saw itself. This moves the feed somewhat backward, but the principal movement is downwardly into engagement with the bottom of the interdental space. The continued movement brings the file also downwardly as shown at Fig. 15 into position to operate upon the teeth while a further continued movement moves both the file and the feed backwardly as shown at Fig. 16, the file all the time acting upon the space between the teeth. From Fig. 16 the parts return to Fig. 13—that is to say, the feed rises to adjacent the file ready to engage the next tooth and advance the saw one step. The means for reciprocating the feed and raising and lowering the file shaft and file it is believed have been sufficiently described in the description of the structure itself.

I claim:—

1. In a gin saw gumming machine, a circular file, means to continually rotate the file, means to raise and lower the file at predetermined intervals, a feed mechanism, means to actuate the feed mechanism while the file is raised, and means to move the file along its axis together with the feed mechanism.

2. In a gin saw gumming machine, a file shaft mounted for longitudinal and rotary movement, means to impart a lateral movement to the file shaft, a feed mechanism, means to impart movement to the feed mechanism when the file is in raised position, and means connecting the file shaft with the feed whereby longitudinal movement is imparted to the file shaft with the movement of the feed.

3. In a gin saw gumming machine, a frame, a yoke mounted upon the frame for swinging movement, a file shaft journaled in the yoke and adapted to move longitudinally upon its axis, a feed arm, means to impart longitudinal movement to the feed arm, and means connecting the file shaft to move with the feed arm.

4. In a gin saw gumming machine, a main frame, a jaw carried by the main frame, means to actuate the jaw to clamp a saw arbor between the main frame and the jaw, an auxiliary frame pivotally connected with the main frame, means to adjust the auxiliary frame angularly relative to the main frame, and filing and feeding mechanism carried by the auxiliary frame.

5. In a gin saw gumming machine, a main frame, means to clamp the main frame upon a saw arbor, an auxiliary frame pivotally connected with the main frame, means to adjust the auxiliary frame angularly relative to the main frame, a file mounted to rotate upon the auxiliary frame and adjusted by the adjustment of the auxiliary frame, and a feed mechanism carried by the auxiliary frame.

6. In a gin saw gumming machine, a main frame, means to clamp the main frame upon a saw arbor, an auxiliary frame pivotally connected with the main frame, means to adjust the auxiliary frame relative to the main frame angularly, a yoke carried pivotally by the auxiliary frame, means to move the yoke about its local axis, a file shaft journaled in the yoke, a feed mechanism carried by the auxiliary frame, and means to move the file shaft in synchronism with the feed mechanism.

7. In a gin saw gumming machine, a feed arm provided with a saw-receiving slot, a tapered ring adjustably carried by the feed arm and spanning the slot, and means to clamp the tapered ring rigidly relative to the arm.

8. In a gin saw gumming machine, a main frame comprising a fork of spaced members, a jaw pivoted to the main frame and composed of spaced members constituting a forked jaw, a frame-supporting strut, and a lever connecting the strut and jaw whereby the weight of the machine clamps the jaw.

9. In a gin saw gumming machine, a main frame comprising spaced saw embracing members, a jaw composed of spaced members the interval of the jaw being in a registry with the interval between the spaced members of the main frame, a machine-supporting strut, a lever pivoted to the frame and pivotally connected with the strut, a link connecting the lever and the jaw whereby the weight of the machine serves to clamp the jaw.

10. In a gin saw gumming machine, a main frame, a jaw carried by the main frame and acting in conjunction with the main frame to grip a saw arbor, a strut composed of telescoping sections adapted to rest upon the floor, and means connecting the strut with the jaw whereby the weight of the machine exerts clamping stress upon the jaw.

11. In a gin saw gumming machine, a main frame provided with a rack, an auxiliary frame pivoted to the main frame and provided with a rack spaced from the rack of the main frame, a pinion interposed between the racks and intergeared therewith, a lever rigidly connected with and to actuate the pinion, and means to lock the parts against movement after adjustment.

12. In a saw gumming machine, a main frame, an auxiliary frame pivoted thereto by a link, spaced racks carried by the main frame and the auxiliary frame, a pinion interposed between and intergeared with the racks, a lever rigidly connected with and to actuate the pinion, and means to lock the parts against movement after adjustment.

13. In a gin saw gumming machine, a frame, a shaft mounted rigidly upon the frame, a gear carried by the shaft, means to drive the gear, a yoke pivotally mounted upon the shaft, a file shaft journaled in the yoke, and a cam carried by the gear proportioned to at times raise the yoke and file shaft.

14. In a gin saw gumming machine, a frame, means carried by the frame for gripping a saw arbor, a feed arm, means carried by the feed arm for engaging a saw upon the arbor, a shaft, means to drive the shaft, and a cam carried by the shaft adapted to raise and lower the end of the feed arm opposite the saw-engaging means.

15. In a gin saw gumming machine, a frame, means to clamp the frame in connection with a gin saw, a feed arm mounted to oscillate upon the frame, a saw-engaging member carried at one end of the arm the opposite end of the arm being weighted to overbalance and raise the saw-engaging end, a cam adapted to raise the weighted end of the arm, and yielding means engaged by the cam to lower the weighted end of the arm when such movement is resisted.

16. In a gin saw gumming machine, a frame, a feed arm mounted to oscillate and reciprocate upon the frame, a file shaft mounted to rotate and to move longitudinally and laterally, eccentrics carried by one of the members, means carried by the other member engaging the eccentrics, and means to adjust the eccentrics to vary the relation between the file shaft and the feed arm.

17. In a gin saw gumming machine, a frame; a feed arm mounted to reciprocate and oscillate upon the frame; a file shaft mounted normally in approximate parallelism with the feed arm, and to rotate, reciprocate and move laterally; spaced eccentrics carried by the feed arm; means to adjust the eccentrics; means to lock the eccentrics in adjusted position; and means carried by the file shaft engaging between the eccentrics to transmit reciprocatory movement from the feed arm to the file shaft, and to permit independent lateral movement of the file shaft relative to the feed arm.

In testimony whereof I affix my signature in presence of two witnesses.

ALBERT A. WOOD.

Witnesses:
 EFFIE F. RODGERS,
 STERLING I. MELVIN.

Copies of this patent may be obtained for five cents each, by addressing the "Commissioner of Patents, Washington, D. C."